United States Patent
Ikeda et al.

(10) Patent No.: US 7,376,332 B2
(45) Date of Patent: May 20, 2008

(54) INFORMATION PROCESSING METHOD AND INFORMATION PROCESSING APPARATUS

(75) Inventors: Hiromi Ikeda, Tokyo (JP); Tsuyoshi Yagisawa, Tokyo (JP); Toshiaki Fukada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 10/964,227

(22) Filed: Oct. 12, 2004

(65) Prior Publication Data

US 2005/0097439 A1 May 5, 2005

(30) Foreign Application Priority Data

Nov. 5, 2003 (JP) .............................. 2003-376190

(51) Int. Cl.
*H04N 5/96* (2006.01)
*H04N 7/00* (2006.01)
*H04N 5/00* (2006.01)

(52) U.S. Cl. ......................................... 386/46; 386/125

(58) Field of Classification Search ................... 386/1, 386/45–46, 125–126
See application file for complete search history.

(56) References Cited

U.S. PATENT DOCUMENTS 6,081,266 A * 6/2000 Sciammarella ............... 715/727
6,334,025 B1 * 12/2001 Yamagami .................... 386/96

FOREIGN PATENT DOCUMENTS

JP 2002-15333 A1 1/2002
WO WO-0018112 3/2000

* cited by examiner

*Primary Examiner*—Thai Q. Tran
*Assistant Examiner*—Nigar Chowdhury

(57) ABSTRACT

In an information processing apparatus or method for presenting multimedia data, a storage unit holds an object in an image, such as an image, characters, or symbols, and sound data associated with the object. Metadata of the object is referred to, and an output parameter of the sound data associated with the object is determined based on the metadata. Then, a sound output unit outputs the sound data at a sound volume or the like based on the output parameter.

14 Claims, 5 Drawing Sheets

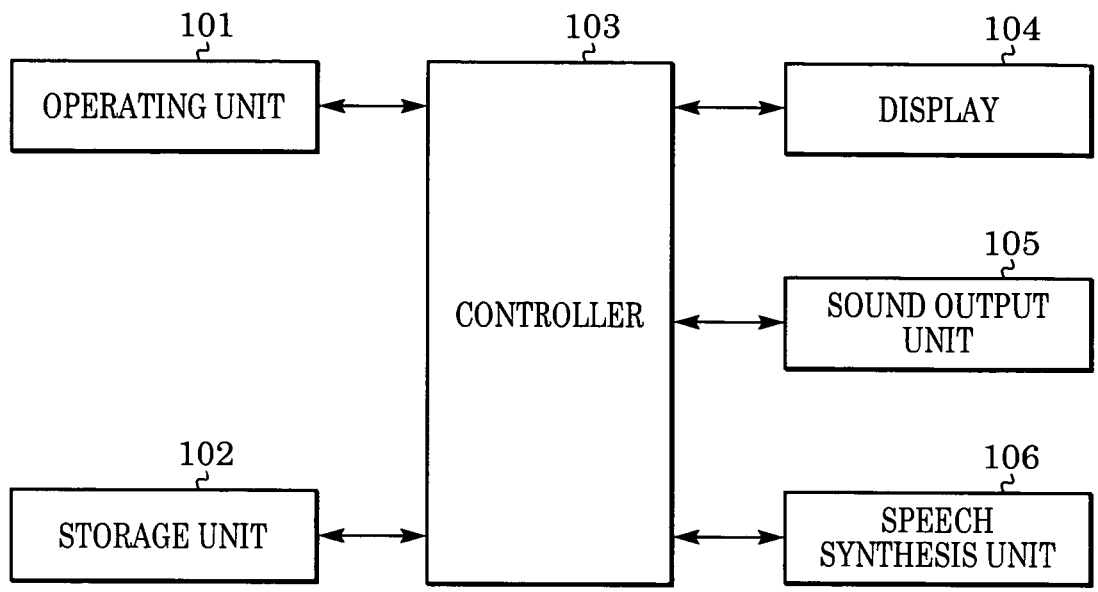
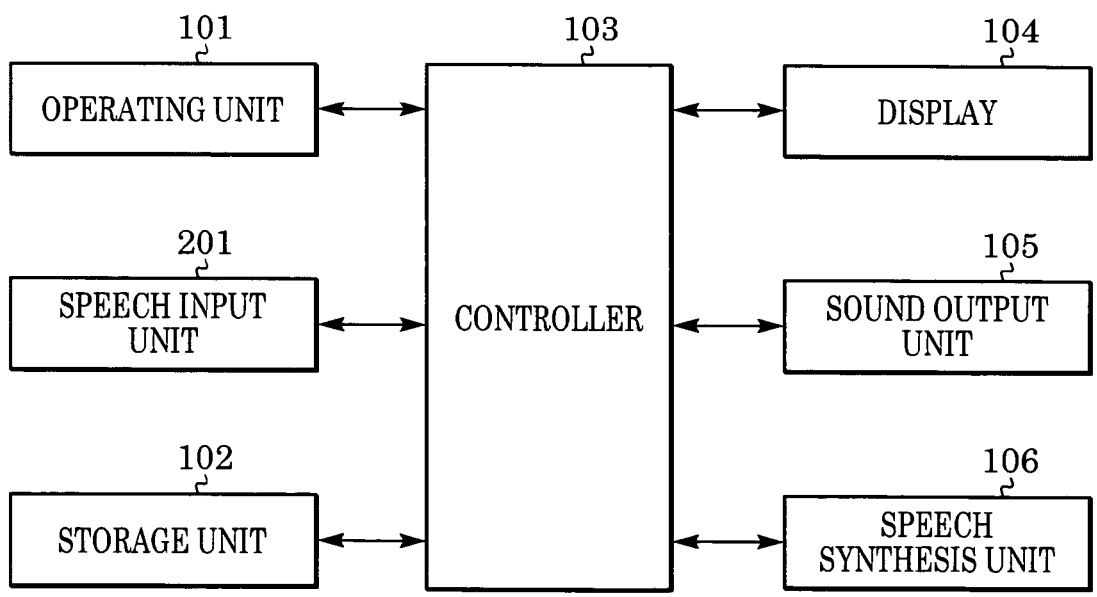

FIG. 3A
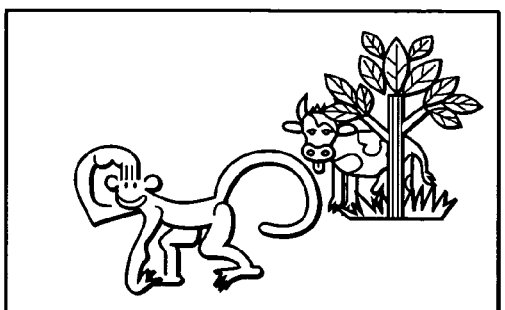
301
FIG. 3B
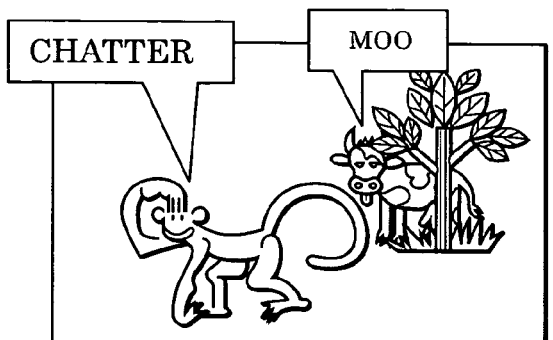
302
FIG. 3C
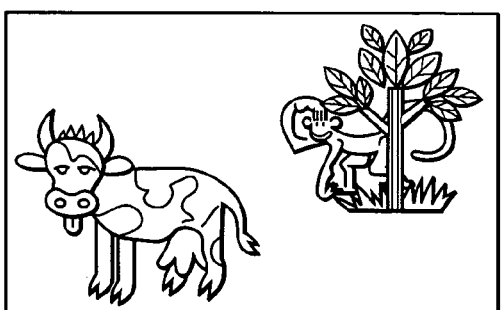
303
FIG. 3D
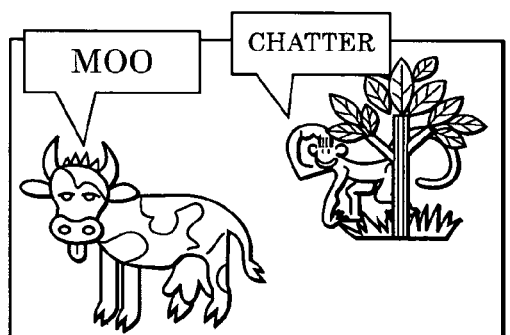
304
FIG. 4
```
<img src="monkey.jpg" style="x:40px; y:80px; height:50px; width:140px; z-index:0;" sound="src:monkey.wav; repeat:2;" shutout="5" />
<img src="tree.jpg" style="x:130px; y:10px; height:60px; width:50px; z-index:-1;" shutout="1" />
<img src="cow.jpg" style="x:120px; y:60px; height:30px; width:60px; z-index:-2;" sound="src:cow.wav; repeat:1;" shutout="5" />
```

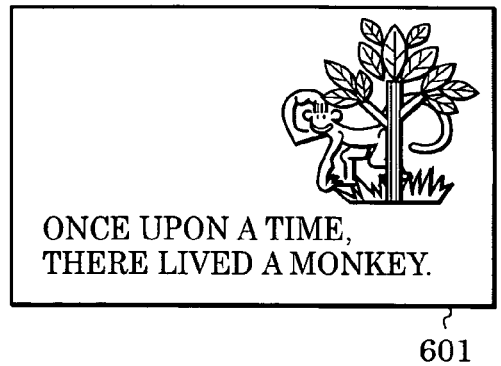
FIG. 6A
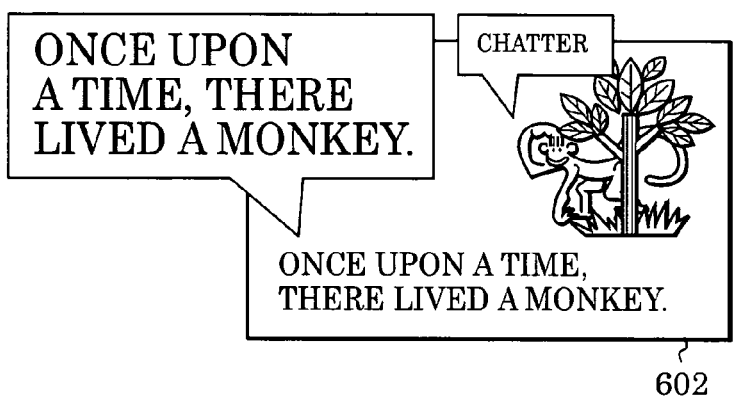
FIG. 6B
FIG. 7A
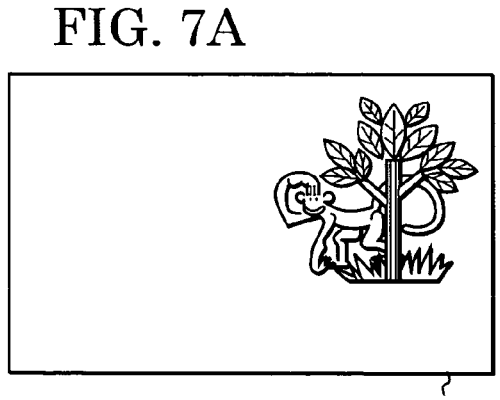
FIG. 7B
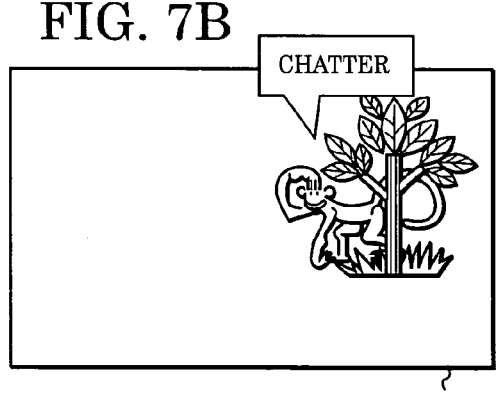
FIG. 7C
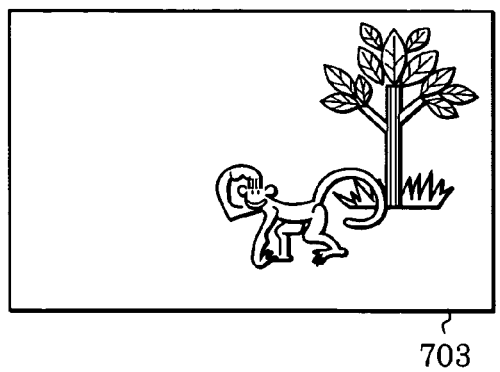
FIG. 7D
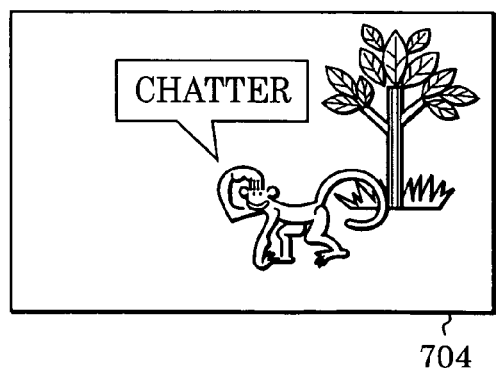

<img src="monkey.jpg" style="x:120px; y:60px; height:30px; width:60px; z-index:-1;" sound="src:monkey.wav; repeat:2;" shutout="5" />

<img src="tree.jpg" style="x:130px; y:10px; height:60px; width:50px; z-index:0;" shutout="1" />

<img src="monkey.jpg" style="x:100px; y:120px; height:45px; width:90px; z-index:1;" sound="src:monkey.wav; repeat:2;" shutout="5" />

<img src="tree.jpg" style="x:130px; y:10px; height:60px; width:50px; z-index:0;" shutout="1" />

INFORMATION PROCESSING METHOD AND INFORMATION PROCESSING APPARATUS

CROSS REFERENCE TO RELATED APPLICATIONS

This application claims priority from Japanese Patent Application No. 2003-376190 filed Nov. 5, 2003, which is hereby incorporated by reference herein.

BACKGROUND OF THE INVENTION

1. Field of the Invention

The present invention relates to information processing techniques for playing back multimedia content.

2. Description of the Related Art

Recently, multimedia content including combinations of data such as moving pictures, still pictures, characters, symbols, graphics, music, and sound is becoming common. Such multimedia content can be played back using a personal computer (PC) or a portable terminal. By presenting image data and sound data in an effective combination, a provider of content can provide richer content compared with a case where only image data or sound data is presented.

With regard to such multimedia content, a display apparatus for presenting video and sound in a coordinated manner is known (e.g., refer to International Publication No. WO0018112). Also, a method of simply designing and editing multimedia content is known (e.g., refer to Japanese Patent Laid-Open No. 2002-15333).

The display disclosed in the former document (WO0018112) forms a sound image for each segment of the screen, so that the display gives a better sense of presence but requires a plurality of sound sources. Also, it is to be noted that the display is to be used as a large display on the street, and is not intended for use by ordinary users.

Furthermore, although the method of simply designing and editing multimedia content, disclosed in the latter document (JP2002015333), allows a user to locate image data, sound data, or the like as desired, association between sound data and image data is not considered.

SUMMARY OF THE INVENTION

The present invention has been made in view of the situation described above. The present invention provides an information processing method and an information processing apparatus that allow multimedia data in which sound data is associated with objects such as images, characters, or symbols to be played back effectively without requiring a creator of the content to define complex settings.

According to an aspect of the present invention, an information processing method is provided for outputting sound data associated with an image object in an image. The information processing method includes: obtaining the image object and the sound data associated with the image object; referring to metadata of the image object; determining a sound data output parameter of the sound data associated with the image object based on the metadata; and outputting the sound data based on the sound data output parameter.

According to another aspect of the present invention, an information processing apparatus is provided for outputting sound data associated with an image object in an image. The information processing apparatus includes an obtaining unit for obtaining the image object and the sound data associated with the object; a referring unit for referring to metadata of the image object; a determining unit for determining a sound data output parameter of the sound data associated with the image object based on the metadata referred to by the referring unit; and an outputting unit for outputting the sound data based on the sound data output parameter.

According to yet another aspect of the present invention, a program is provided for allowing a computer to execute: an obtaining procedure for obtaining an image object in an image and sound data associated with the image object; a referring procedure for referring to metadata of the image object; a determining procedure for determining a sound data output parameter of the sound data associated with the image object based on the metadata referred to by the referring procedure; and an outputting procedure for outputting the sound data from an output device based on the sound data output parameter.

Further features and advantages of the present invention will become apparent from the following description of the embodiments with reference to the attached drawings.

BRIEF DESCRIPTION OF THE DRAWINGS

FIG. 1 is a block diagram showing the basic configuration of an information processing system according to a first embodiment of the present invention.

FIG. 2 is a diagram showing the basic configuration of an information processing system according to a modification of the first embodiment.

FIGS. 3A to 3D are illustrations showing an example operation of the information processing system according to the first embodiment.

FIG. 4 is an example of internal data held by the information processing system according to the first embodiment.

FIGS. 6A and 6B illustrate another example operation of the information processing system according to the first embodiment.

FIGS. 7A to 7D illustrate an example operation of an information processing system according to a second embodiment of the present invention.

FIGS. 8A and 8B are diagrams for explaining an example of internal data held by the information processing system according to the second embodiment.

DESCRIPTION OF THE EMBODIMENTS

Figure 5:
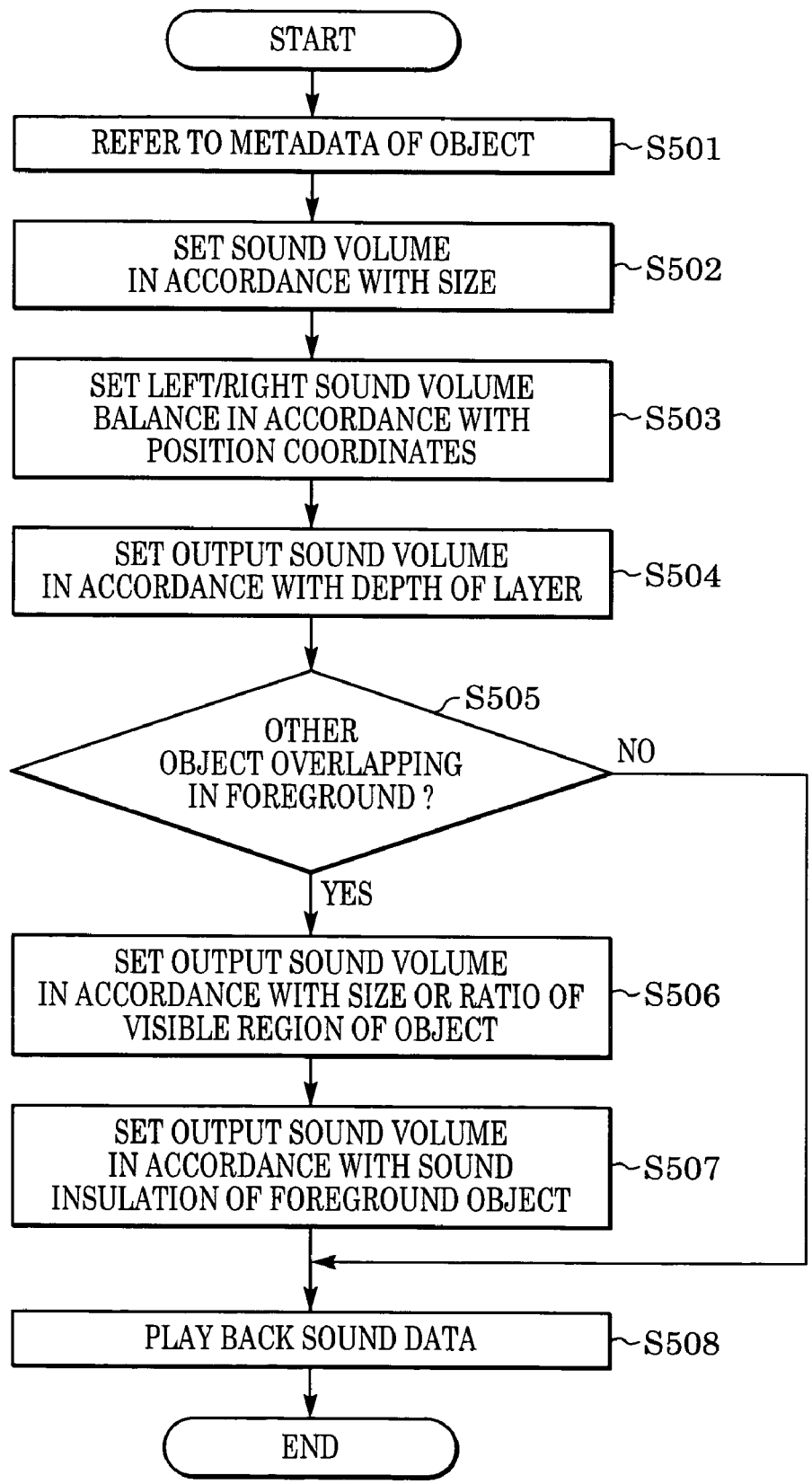
FIG. 5 is a flowchart of a procedure for playing back sound data in the information processing system according to the first embodiment.

Exemplary embodiments of the present invention are described below with reference to the drawings.

First Embodiment

FIG. 1 is a block diagram showing the basic configuration of an information processing system according to a first embodiment of the present invention. Referring to FIG. 1, the information processing apparatus according to the first embodiment includes an operating unit 101, a storage unit 102, a controller 103, a display 104, a sound output unit 105, and a speech synthesis unit 106.

The operating unit 101 is implemented by an input device, such as a set of buttons, a keyboard, a mouse, a touch panel, a pen, a tablet, or some combination thereof. The operating unit 101 functions as in input interface for allowing input of various commands, text data, or the like to the information processing apparatus.

The storage unit 102 is implemented by a hard disk drive for storing various information, a storage medium for providing various information to the information processing system, such as a CD-ROM (compact disk—read-only memory) or a DVD-ROM (digital versatile disk—read-only memory), or the like. The hard disk drive, storage medium, or the like that implements the storage unit 102 stores various application programs, a user-interface controlling program, various data needed to execute these programs, multimedia data including object data and sound data, and the like. These data are read into the information processing system under the control of the controller 103 provided at a subsequent stage.

The controller 103 is implemented by a work memory, a CPU (central processing unit) or an MPU (micro-processing unit), and other associated parts. The controller 103 reads programs or data stored in the storage unit 102 and executes various processing. The display 104 is implemented, for example, by a liquid crystal display (LCD). The display 104 displays various information composed of image, text, or the like. The display 104 may be implemented by a touch panel. In that case, the display 104 also functions as the operating unit 101. That is, the display 104 allows input of various commands to the information processing system.

The sound output unit 105 is implemented by speakers, a headphone, or the like that allows stereo sound output in which the same sound data is output at different volumes in left and right directions. The speech synthesis unit 106 includes a digital-to-analog (D/A) converter. The speech synthesis unit 106 creates audio data from text to be read under the control of the controller 103, and converts the audio data from digital to analog, and the resulting sound is output through the sound output unit 105. The speech synthesis can be carried out by known techniques.

FIG. 2 is a diagram showing the basic configuration of an information processing system according to a modification of the first embodiment. The information processing system shown in FIG. 1 may further include a speech input unit 201, as shown in FIG. 2. The speech input unit 201 includes a microphone, an A/D converter, and other associated parts, and it receives input of a user's voice. Speech that is input from the speech input unit 201 may be recorded, or recognized using known speech recognition techniques. Also, text data input from the operating unit 101 may be translated into speech data through speech synthesis by the speech synthesis unit 106.

Next, an example operation of the information processing system according to the first embodiment, configured as described above, is described. FIGS. 3A to 3D are illustrations showing an example operation of the information processing system according to the first embodiment. In the example shown in FIGS. 3A to 3D, images (objects) of a tree, a monkey, and a cow are located in different layers, and pieces of sound data (e.g., voices) are associated with the image of the monkey and the image of the cow, respectively. Referring to FIG. 3A, a picture 301 is an example in which the image of the monkey is located in a foremost (front) layer, the image of the tree is located in an intermediate layer, and the image of the cow is located in a backmost layer. In this case, the image of the monkey is located forward of the image of the cow. Thus, the sound data associated with the image of the monkey is played back at a larger (louder) sound volume than the sound data associated with the image of the cow, as indicated in a picture 302 shown in FIG. 3B. Although the number of layers is three in this embodiment for the convenience of description, it is to be understood that the number of layers may be greater than or less than three.

Referring to FIG. 3C, a picture 303 is an example where the image of the cow is located in a foremost (front) layer, the image of the tree is located in an intermediate layer, and the image of the monkey is located in a backmost layer. In this case, the image of the cow is located forward of the image of the monkey. Thus, the sound data associated with the image of the cow is played back at a larger (louder) sound volume than the sound data associated with the image of the monkey, as indicated in a picture 304 shown in FIG. 3D.

The image data and sound data may be located as described above using various user interfaces, for example, a graphical user interface (GUI) such as an authoring tool. The information processing system internally stores metadata for each object, such as location and associated sound data, as shown in FIG. 4. FIG. 4 illustrates an example of data internally held by the information processing system according to the first embodiment. FIG. 4 shows an example in which the location of image data in the picture 301 shown in FIG. 3A is written in XML. The internal data may be stored in advance by the information processing system, or the information may be obtained from another apparatus or an external source at the time of playback and temporarily stored.

In the example shown in FIG. 4, image data is located using tags having an "img" element. A uniform resource locator (URL) of the image data is specified using an "src" attribute. The location (x, y), size (height, width), and layer (z-index) are specified using a style attribute. The layer of the image comes forward as the value of z-index becomes larger. For example, in FIG. 4, the image for the monkey has a z-index of zero, the image of the tree has a z-index of −1 and the image of the cow has a z-index of −2. Therefore, the image of the monkey (which has the z-index having the greatest value) is in the foremost layer (front) and the image of the cow (which has the z-index with the lowest value) is in the back (front) layer as shown in FIG. 3A. A URL of associated sound data (src), and the number of times (repeat) and order of playback (order) are specified using a "sound" attribute. The value of "repeat" is "−1" when the sound data is to be repeated endlessly. Sound data is played back in increasing order of the value of "order". Sound insulation of the object is specified using a "shutout" attribute. Sound insulation becomes larger as the value of "shutout" becomes larger. In the example shown in FIG. 4, sound data cow.wav associated with the image of the cow is played back once, and then sound data monkey.wav associated with the image of the monkey is played back twice.

The information processing system according to this embodiment plays back multimedia content based on the internal data described above. The multimedia content itself is played back according to a control program to display still pictures, moving pictures, characters, symbols, and the like. Images are displayed based on specified data, such as coordinates, using techniques implemented in various products available, such as a browser that parses HTML (hypertext markup language). A procedure of playing back sound data is described next with reference to a flowchart shown in FIG. 5.

FIG. 5 is a flowchart illustrating an exemplary procedure of playing back audio data in the information processing system according to the first embodiment. When the control program prompts playback of sound data according to the order and number of times of playback based on the internal data described above, reference is made to metadata of an object (information such as location, i.e., coordinates, size, layer, and associated sound data) (step S501).

Then, in step S502, sound volume is set in accordance with the size of the object. For example, when an area of the object in the image is large, sound volume is set to be larger (louder) compared with a case where the area of the same object in the image is smaller.

Then, in step S503, the left-right balance of sound volume is set in accordance with the position coordinates of the object. For example, when the associated object is located on a right side of the entire picture, the balance of output sound is set such that the volume of sound from the right direction is larger (louder) than the volume of sound from the left direction. On the other hand, when the associated object is located on a left side of the entire picture, the balance of output sound is set such that the volume of sound from the left direction is larger (louder) than the volume of sound from the right direction. Alternatively, sound data may be played back only from a direction corresponding to the location of the object.

Then, in step S504, the output sound volume is set in accordance with the depth of the layer. The sound volume is set to be larger when the associated object is located forward (i.e., in an upper layer) compared with a case where the object is located backward (i.e., in a lower layer). For example, with reference to an object in a foremost layer, the sound volume is decreased by 1 dB as the layer becomes deeper by one.

Then, in step S505, it is checked whether another object is overlapping in front of the object, and a ratio of overlapping or the like is detected. When overlapping is detected (yes in step S505), processing proceeds to step S506 where the output sound volume is set in accordance with the size or ratio of a visible region of the object. The sound volume is set to be smaller (softer) as the size or ratio of the visible region of the object becomes smaller. For example, when half of the object is visible, sound volume is reduced to half of the current setting.

Then, in step S507, the output sound volume is set in accordance with sound insulation of the foreground object. The sound volume is set to be smaller as sound insulation of the foreground object becomes larger. For example, when sound insulation of the foreground object is 8, the sound volume is decreased by 8 dB from the current setting. When a plurality of foreground objects exists, the sound volume is decreased correspondingly to the total sound insulation of the plurality of objects. For example, when an object with a sound insulation of 2 and an object with a sound insulation of 3 exist in a foreground layer, the sound volume is decreased by 5 dB from the current setting.

Then, in step S508, the sound data is played back in accordance with the setting of sound volume, left-right balance, and the like. In the case of speech synthesis, speech synthesis is carried out instead of playback. Speech synthesis can be carried out using known techniques. When no overlapping is detected (no in step S505), in step S508, sound data is played back based on the current setting, i.e., the sound volume set in accordance with the size, the sound volume balance set in accordance with the depth of the layer, and so forth.

Steps S502, S503, S504, S506, and S507 may be used selectively. Furthermore, playback of sound data may be based on speech synthesis.

By setting volume and left-right balance of sound data through the procedure described above, sound data can be played back in accordance with locations of objects. For example, sound from an object located backward (i.e., in a deeper layer) is output at a smaller volume, and sound from an object located leftward is output at a larger volume from the left side. When audio data is played back and output from the sound output unit 105, the object itself is displayed on the display 104.

The objects may be characters, symbols, graphical shapes, or the like, as well as images. FIGS. 6A and 6B illustrate another example operation of the information processing system according to the first embodiment. FIGS. 6A and 6B show an example where characters and images are located and are played back by the same procedure in the flowchart shown in FIG. 5. FIG. 6A shows an example picture 601 where images of a tree and a monkey are located together with characters and speech synthesis is carried out for the characters. In the example, the characters are located in a foremost layer, the image of the tree is located in an intermediate layer, and the image of the monkey is located in a backmost layer. In this case, the characters are located forward of the image of the monkey, so that sound generated by speech synthesis of the characters is output at a larger volume than sound associated with the image of the monkey, as indicated in a picture 602 shown in FIG. 6B. Furthermore, the left-right balance of sound volume is adjusted so that the sound associated with the image of the monkey comes from the right side.

As described above, in the information processing system according to the first embodiment, common metadata is used between sound data and objects, such as images, characters, or symbols in multimedia content stored as internal data. Thus, the multimedia content can be played back such that the object and sound are associated with each other more effectively, without requiring a creator of the content to define complex settings.

Second Embodiment

An information processing system according to a second embodiment of the present invention is described next. The first embodiment described above relates to an example where sound data is associated with an object, such as still pictures or characters. In contrast, the second embodiment relates to an example where sound data is associated with a dynamic object, such as animation or switching of slides. An operation of the information processing system according to the second embodiment is described next.

FIGS. 7A to 7D illustrate an example operation of the information processing system according to the second embodiment. FIGS. 7A to 7D show an example where images of a tree and a monkey are located and sound data is associated with the image of the monkey. The image of the monkey is a moving picture that moves from a position in a picture 701 to a position in a picture 703, i.e., from back to front of the image of the tree and from right to center of the entire image as viewed in FIGS. 7A to 7D. In this case, the process according to the flowchart shown in FIG. 5 is executed for each frame, allowing coordinated presentation of objects and sound.

For example, the volume of sound assigned to the image of the monkey is adjusted from right to center as the frame shifts from the picture 701 to the picture 703. Furthermore, as the frame shifts from the picture 701 to the picture 703, the volume of output sound is increased, as indicated in pictures 702 and 704. FIGS. 8A and 8B show metadata used in this example. FIGS. 8A and 8B are diagrams for explaining example data internally held by the information processing system according to the second embodiment. Data 801 in FIG. 8A corresponds to the picture 701 in FIG. 7A, and data 802 in FIG. 8B corresponds to the picture 703 in FIG. 7C.

Furthermore, by performing interpolation for objects or sound between pages, change in sound that is output when the frame is switched can be smoothed. The interpolation can be performed using known techniques, such as linear interpolation. For example, sound volume is gradually increased when the frame switches from the picture 701 in FIG. 7A to the picture 703 in FIG. 7C.

Furthermore, the transparency of an object may be used as metadata (attribute of the object). For example, sound volume is set to 0 when the transparency is 100%, and the sound volume is increased by 1 dB as the transparency is decreased by 1%. The transparency of an object need not necessarily be used, and sound data associated with an object with a transparency of 100% may be used as background music.

As described above, according to the second embodiment, common metadata is used between sound data and objects such as images, characters, or symbols included in multimedia content. Thus, association between dynamic object and sound can be presented more effectively without requiring a creator of the content to determine complex settings. This embodiment can be applied, for example, to an electronic picture book or electronic album, a presentation, or the like.

OTHER EMBODIMENTS

Although the embodiments have been described hereinabove, the present invention may be embodied in various forms, such as a system, an apparatus, a method, a program, or a storage medium. Furthermore, the present invention may be applied to a system composed of a plurality of apparatuses or an apparatus composed of a single device.

The present invention may also be achieved by providing a program of software implementing the functions of the embodiments described above (a program corresponding to the flowchart shown in FIG. 5) to a system or an apparatus directly or remotely so that a computer of the system or the apparatus is allowed to read and execute the program code.

Thus, the program code installed on a computer to achieve the processing functions according to the present invention is within the scope of the present invention. That is, the computer program for achieving the processing functions falls within the scope of the present invention.

In that case, the program may be object code, a program executed by an interpreter, script data supplied to an operating system, or the like, as long as it functions as a program.

A recording medium for supplying the program may be a floppy disk, a hard disk, an optical disk, a magneto-optical disk, an MO (magneto-optical), a CD-ROM, a CD-R (compact disk—recordable), a CD-RW (compact disk—rewriteable), a magnetic tape, a non-volatile memory card, a ROM (read-only memory), a DVD (DVD-ROM or DVD-R), or the like.

Alternatively, the program may be obtained by accessing a Web page on the Internet using a browser of a client computer and downloading a computer program according to the present invention or a file including a compressed program and having an automatic installation function from the Web page to a recording medium, such as a hard disk. Alternatively, program code of a program according to the present invention may be divided into a plurality of files and the files may be downloaded from different Web pages. That is, a World Wide Web (WWW) server that allows a plurality of users to download a program file for achieving processing functions of the present invention by a computer falls within the scope of the present invention.

Furthermore, a program according to the present invention may be encrypted and stored on a storage medium such as a CD-ROM for distribution to a user. In that case, a user who satisfies a predetermined condition is allowed to download key information for decryption from a Web page via the Internet, using the key information to execute the encrypted program and install the program on a computer.

Furthermore, instead of a computer reading and executing a program to achieve the functions of the embodiments described above, the functions of the embodiments may be achieved by an operating system or the like running on the computer, executing actual processing in part or in entirety according to the program.

Furthermore, a program read from a recording medium may be written to a memory of a function extending board or a function extending unit connected to the computer so that a CPU or the like of the function extending board or the function extending unit executes actual processing in part or in entirety according to the program, in order to achieve the functions of the embodiments described above.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing method for outputting sound data associated with an image object in an image, the information processing method comprising the steps of:
   obtaining the image object and the sound data associated with the image object;
   referring to a transparency of the image object included in metadata of the image object;
   setting a sound volume of the sound data associated with the image object in accordance with the transparency of the image object; and
   outputting the sound data at the volume set,
   wherein the sound volume is set to be smaller as the transparency is larger.

2. The information processing method according to claim 1, wherein the metadata comprises location coordinates of the image object, and the sound data volume is set based on the transparency and the location coordinates of the image object.

3. The information processing method according to claim 2, wherein a balance of sound volume is set with regard to left and right directions of the sound data output.

4. The information processing method according to claim 3, wherein when the image object is located on a right side of the image, the sound data associated with the image object is output such that a sound volume in the right direction is larger than a sound volume in the left direction and when the image object is located on a left side of the image, the sound data associated with the image object is output such that a sound volume in the left direction is larger than a sound volume in the right direction.

5. The information processing method according to claim 1, wherein the metadata comprises a size of the image object and the sound volume is set based on the transparency and the size of the image object.

6. The information processing method according to claim 5, wherein sound data associated with a larger image object is output at a sound volume that is larger than a sound volume for sound data associated with a smaller image object.

7. The information processing method according to claim 1, wherein the metadata comprises a layer of the image object and the sound volume is set based on the transparency and the layer.

8. The information processing method according to claim 7, wherein sound data associated with an image object in an upper layer is output at a sound volume that is larger than a sound volume for sound data associated with an image object in a lower layer.

9. The information processing method according to claim 8, further comprising a step of detecting an overlap between the image object and an other image object located in a layer that is upper in relation to the layer of the image object, wherein the sound data output parameter associated with the image object is determined in accordance with a ratio of overlapping between the image object and the other image object.

10. The information processing method according to claim 7, wherein when the image is a single frame image of a moving picture composed of a plurality of frame images and the image object is located in different layers in preceding and succeeding frames and sound data associated with the image object in a current frame is output at a sound volume determined by interpolating sound data associated with the image object in the preceding and succeeding frames.

11. The information processing method according to claim 1, wherein the metadata comprises a sound insulation of the image object, and the sound volume is set based on the transparency and the sound insulation.

12. An information processing apparatus for outputting sound data associated with an image object in an image, the information processing apparatus comprising:

obtaining means for obtaining the image object and the sound data associated with the image object;

referring means for referring to a transparency of the image object included in metadata of the image object;

setting means for setting a sound volume associated with the image object in accordance with the transparency of the image object referred to by the referring means; and outputting means for outputting the sound data at the volume set by the setting means, wherein the sound volume is set to be smaller as the transparency is larger.

13. A program a recording medium storing a computer program for allowing a computer to execute:

an obtaining procedure for obtaining an image object in an image and sound data associated with the image object;

a referring procedure for referring to a transparency of the image object included in metadata of the image object;

a setting procedure for setting a sound volume of the sound data associated with the image object in accordance with the transparency of the image object; and an outputting procedure for outputting the sound data from an outputting device at the volume set in the setting procedure, wherein the sound volume is set to be smaller as the transparency is larger.

14. A recording medium having recorded thereon the program according to claim 13.

* * * * *